(12) United States Patent
Deuber

(10) Patent No.: US 9,387,978 B2
(45) Date of Patent: Jul. 12, 2016

(54) CAPSULE FOR AN EXTRACTION MATERIAL, METHOD FOR PRODUCING THE CAPSULE, AND DEVICE FOR BREWING COFFEE

(75) Inventor: Louis Deuber, Richterswil (CH)

(73) Assignee: QBO COFFEE GMBH, Wallisellen (CH)

( * ) Notice: Subject to any disclaimer, the term of this patent is extended or adjusted under 35 U.S.C. 154(b) by 251 days.

(21) Appl. No.: 13/695,213

(22) PCT Filed: May 2, 2011

(86) PCT No.: PCT/CH2011/000100
§ 371 (c)(1),
(2), (4) Date: Nov. 13, 2012

(87) PCT Pub. No.: WO2011/137550
PCT Pub. Date: Nov. 10, 2011

(65) Prior Publication Data
US 2013/0055903 A1    Mar. 7, 2013

(30) Foreign Application Priority Data

May 4, 2010    (EP) .................................... 10405093

(51) Int. Cl.
*A47J 31/00*    (2006.01)
*B65D 85/00*    (2006.01)
*B65D 85/804*   (2006.01)
*A47J 31/06*    (2006.01)
*A47J 31/36*    (2006.01)

(52) U.S. Cl.
CPC ......... *B65D 85/8043* (2013.01); *A47J 31/0689* (2013.01); *A47J 31/3623* (2013.01); *A47J 31/369* (2013.01)

(58) Field of Classification Search
CPC . A47J 31/3695; A47J 31/369; A47J 31/3628; A47J 31/3623; B65D 85/8043
USPC ......................... 99/295, 323; 426/77, 79, 115
See application file for complete search history.

(56) References Cited

U.S. PATENT DOCUMENTS

| 1,377,316 | A | * | 5/1921 | Clermont ........................ 99/306 |
| 4,348,421 | A |   | 9/1982 | Sakakibara et al. |
| 4,471,689 | A | * | 9/1984 | Piana .............................. 99/295 |

(Continued)

FOREIGN PATENT DOCUMENTS

| CN | 101014513 | 8/2007 |
| EP | 0451980 | 10/1991 |

(Continued)

OTHER PUBLICATIONS

WO 86/02537 (Ingold) Nov. 1985.*

*Primary Examiner* — Reginald L Alexander
(74) *Attorney, Agent, or Firm* — Rankin, Hill & Clark LLP

(57) ABSTRACT

A coffee capsule is provided, the outer dimensions of which are matched to the size of a filtered-coffee capsule, but which has a separating element that separates an empty area from an extraction-material area. Furthermore, at least one liquid channel is provided, which passes through the empty area for example. The liquid channel or liquid channels and the extraction-material area are designed in such a way that water introduced into the capsule at an injection location or a beverage produced in the capsule substantially does not enter the empty area.

23 Claims, 6 Drawing Sheets

(56) References Cited

U.S. PATENT DOCUMENTS

| | | |
|---|---|---|
| 4,859,337 A | 8/1989 | Woltermann |
| 5,472,719 A | 12/1995 | Favre |
| 6,550,371 B1 * | 4/2003 | Del Bon et al. ................. 99/295 |
| 7,798,055 B2 * | 9/2010 | Mandralis et al. .............. 99/295 |
| 8,635,945 B2 * | 1/2014 | Verbeek .......................... 99/295 |
| 2010/0068361 A1 * | 3/2010 | Bongers et al. ............... 426/431 |

FOREIGN PATENT DOCUMENTS

| | | |
|---|---|---|
| EP | 1440910 | 7/2004 |
| JP | 62-163040 | 10/1987 |
| JP | 2003-265320 | 9/2003 |
| WO | 2008/011913 | 1/2008 |

* cited by examiner

CAPSULE FOR AN EXTRACTION MATERIAL, METHOD FOR PRODUCING THE CAPSULE, AND DEVICE FOR BREWING COFFEE

BACKGROUND OF THE INVENTION

1. Field of the Invention

The invention concerns the preparation of beverages or the like from an extraction material contained in a capsule, for example ground coffee. In particular, the invention concerns a pierceable capsule as a portion pack, and a method for producing the same.

2. Description of Related Art

Extraction devices for preparing beverages from an extraction material supplied in a portion pack are known, for example, as coffee or espresso machines and continue to enjoy increasing popularity. In many such systems, the portion packs are designed as capsules in which the extraction material is encased, for example in an airtight manner. For the purpose of extraction, the capsule is pierced from two opposite sides. An extraction liquid—generally hot water—is introduced on the first side. The extraction product is discharged from the capsule on the second side. In such a case, a considerable pressure, for example of 5-20 bar, must prevail in the interior of the capsule.

Aluminum and plastics, for example polypropylene, have become most commonly used as capsule materials. Aluminum capsules keep the extraction material fresh for a long time, but require a considerable amount of energy in respect of production. Polypropylene capsules are advantageous in respect of energy consumption and disposal, but impose a greater challenge to the piercing mechanism.

Both, capsules with integrated filtering means and capsules merely encasing the extraction material are commercially available. In the latter case, the piercing mechanism needs to be designed in a manner preventing the extraction material escaping from the capsule together with the extraction product.

An example of a capsule without integrated filtering means is disclosed in EP 1 886 942, for example.

EP 1 344 722 discloses a cup-shaped capsule. The capsule according to these specifications comprises an internal distribution or collection element, which separates a first region of the capsule, which region is to be filled with water or the beverage, from a second region containing the extraction material. The distribution or collection element is provided with a large number of channels for distributing the water or for collecting the beverage, and is designed and arranged in such a manner that it is not pierced by the perforation means of the coffee machine.

Capsules with an integrated filter are also known, for example from US 2005/0051478. The filter performs the function of a paper filter of a known filter coffee machine: water is injected into that region of the capsule, which contains the extraction material, by a piercing spike at a low pressure or at zero pressure. After the extraction process, the coffee passes through the capsule's own paper filter into a collection region, where it is collected by a further piercing spike.

WO 2008/011913 discloses a capsule comprising an outlet closed by a "crema" forming web. It further comprises a safety lid with a shoulder retaining the web. On the side opposite the outlet, there is a lid forming a ring-shaped recess around an inlet.

Filter coffee continues to be very popular in many regions and cups are often filled with large portions of up to 0.3 or 0.4 liters of filter coffee. For the preparation of such portions from capsules, commonly known portion capsules that are designed to hold no more than 6 to 8 g coffee, is often insufficient. Therefore, coffee machines using portion capsules are not very widespread in markets where filter coffee is popular. Where they are used, however, the capsules are considerably larger than the known capsules of capsule systems intended for preparing espresso. The coffee machines comprise a relatively large brewing chamber which is adapted for relatively large portion capsules and comprise a pump designed accordingly for delivering relatively large amounts of hot water at a low pressure. Therefore, these coffee machines are not suitable for brewing espresso.

However, it would be advantageous if filter coffee lovers could also use the available means to brew an espresso if desired.

BRIEF SUMMARY OF THE INVENTION

The object of the invention is to find a solution to this problem. In particular, the solution should provide lovers of both, large volumes of filter coffee (to be prepared with relatively large quantities of coffee) and espresso coffee to with both beverages without the need for two entirely different appliances.

This object is achieved by the invention as defined in the patent claims.

According to a first aspect of the invention, a portion capsule for a brewed beverage, in particular a coffee capsule, is provided, the outer dimensions of which correspond to the size of a capsule for a large portion of filter coffee (for example 300 ml or more) but which comprises a separation element separating an empty region from an extraction material region. At least one liquid channel, which for example traverses the empty region, is also provided. The liquid channel/the liquid channels and the extraction material region are designed in a manner essentially preventing the water introduced into the capsule at an injection location or beverage produced in the capsule from entering the empty region.

The extraction material region, the empty region, the separation element and the liquid channels are all arranged inside the capsule, that is to say, within the space enclosed by the outer wall.

In general, the empty region is bounded on the one hand by the separation element, and on the other by a portion of the wall of the capsule.

In the present text, the term "filter coffee" indicates coffee brewed in relatively large quantities of liquid and at a low pressure of, for example, less than 5 bar, in particular, 3 bar or less. "Espresso" stands for coffee beverages brewed at a high pressure of for example, more than 5 bar or more than 8 bar. The term "filter coffee" therefore also includes coffee beverages whose brewing process does not involve an actual filter, and "espresso" also includes, for example, an "espresso lungo".

Filling a large capsule with a volume of, for example, 30 ml with a small amount of coffee of, for example, approximately 7 g has not proved favorable because in such a configuration, the coffee powder would simply be swirled about and it would not be possible to brew an espresso.

The procedure according to the first aspect, therefore, makes it possible for a portion capsule with a comparatively large volume to comprise a filling region of reduced volume, specifically the extraction material region, containing a reduced quantity of coffee. Due to the liquid channels, however, and in contrast to the approaches known from the prior art, the external capsule volume (the whole capsule interior) is not filled completely with liquid. Thus when preparing espresso, the greater volume of the capsule does not require an increased pumping capacity of a liquid pump and/or the cycle time, which is important for the quality of the beverage, than in known espresso machines. Furthermore, there is no need to brew a beverage quantity which is greater by the difference in capsule volume (compared to known capsules), and the capsule will not be filled to a large percentage with hot water or beverage after the brewing process. The difference in volume between a "large" capsule for filter coffee—this should accommodate up to approximately 15 g of coffee or more and therefore comprise a usable volume of approximately 30-34 ml—and an espresso capsule with approximately half that volume is highly relevant when compared with the liquid volume of an average espresso of, for example, 25 ml-40 ml.

In comparison to feasible systems with a coffee machine which is designed for capsules of different sizes, the coffee machine for capsule systems according to the first aspect of the invention advantageously requires only one brewing chamber in order to brew coffee with different filling volumes. Therefore, the supply and output lines to and from the brewing chamber, the piercing means, the movement device for closing the brewing chamber etc. accordingly do not need to be provided in duplicate.

The empty region can be a hollow space region which is formed by the external capsule wall and the separation element and is substantially filled only with air or a protective gas; a suitable filling material, for example based on a solid foam, can be present in the empty region. The empty region can be traversed by the liquid channels leading to the extraction material region, the channels having the form of pipes, for example. Among the embodiments with liquid channels traversing the empty region and leading to the extraction material region, the ones in which the empty region is located on the injection side of the capsule and the extraction material region is located on the extraction side of the capsule are often particularly favourable. The positions of the liquid channels are then matched to the positions of injection spikes of the coffee machine brewing module such that the brewing liquid is automatically injected into the liquid channels.

The liquid channels do not necessarily have to traverse the empty region in the sense that they are surrounded by the empty region all the way around, but might, for example, be guided along a lateral wall.

In embodiments receiving the injected liquid on the side of the empty region, the injection location will generally be defined by the point at which the liquid channels meet an injection-side outer wall. The position of the piercing spikes of the brewing module is then matched to the capsule such that the outer wall is perforated at the corresponding location and that the piercing opening extends only over a surface region which is covered by the corresponding liquid channel.

However, this does not preclude a specially provided collection region being present on the injection side, from where the liquid enters the liquid channels and subsequently the extraction region from said channels.

In embodiments receiving the injected liquid on the side of the extraction material region, the corresponding considerations apply for the location of the piercing spikes of the discharge apparatus.

The procedure according to the first aspect of the invention can be carried out with various injection and discharge apparatuses. These include, on the one hand, systems in which the capsule is pierced simultaneously on the injection side and on the extraction side (on the side of the discharge apparatus). These have the advantage, among others, that they also function when—for example for brewing filter coffee—the pressure of the water supplied is not high. On the other hand, the procedure is also suitable for systems in which the perforation of the capsule on the extraction side occurs after the brewing water has been introduced, and as a result of the pressure generated thus. An example of a system, which is suitable for polypropylene capsules, is found in PCT/CH2010/000098, the content of said document forming a constituent part of the present patent application by reference.

The procedure according to the first aspect of the invention can also be realized using a very wide variety of capsule outer shapes and refinements. These include the known rotationally symmetrical cup shape, but also alternative shapes as disclosed, for example, in PCT/CH2010/000097, the content of said document likewise forming a constituent part of the present patent application by reference.

The separation element can be or comprise a separation wall; however, the shape of the separation element is not critical.

The separation element can be formed by an insertion part which is to be inserted into the capsule. Said insertion part forms a separation wall between the extraction material region and the empty region and also the at least one liquid channel. Said insertion part is formed and/or connected in a sealing manner to an outer capsule wall, so that liquid introduced into the capsule does not enter the empty region in substantial quantities.

A plurality of passage openings are formed between the extraction material region and the liquid channel, said passage openings allowing liquid to pass through, but being designed such that the coffee powder does not enter the liquid channel in substantial quantities. For example, the passage openings can be formed so as to taper in a conical manner in the direction of the liquid channel. This shape has the effect that coffee powder is captured/wedged in the funnel-like conical region. However, in general, the insertion part or the separation element designed in some other way will not function as a filter but simply serve to separate the extraction material region and the empty region and possibly to form the liquid channels.

It is also possible for the liquid channels themselves to be filled with extraction material and therefore at least partially form the extraction material region.

The at least one liquid channel is sealed off from the empty region, for example, by the insertion part being connected to the outer wall of the capsule in a liquid-tight manner at the point where the liquid channel meets the outer wall. This connection can be an (ultrasonically) welded connection, an adhesive bond or another suitable connection. As an alternative, another suitable sealed connection can also be provided, for example by an elastically deformable sealing element of the liquid channel being pressed against the outer wall.

The extraction material region can also be sealed off in the direction of the empty region, for example, likewise by a liquid-tight connection (weld; adhesive bond) of the insertion part or of the separation element to the outer wall. As an alternative to this, the insertion part or the separation element can have a seal element which is elastically deformable and is pressed against the outer wall. In particular, a seal element of this kind can be formed such that it is additionally pressed against the outer wall by an internal pressure in the extraction material region. The seal element can be, for example, a seal tab which projects outward.

As an alternative or in addition to this, a seal tab can also be clamped between joined parts of the capsule outer wall, as a result of which a labyrinth seal-like effect is produced.

The external volume of a portion capsule according to the first aspect of the invention is, for example, between 25 and 40 ml. A ratio between the volume of the extraction material region and the capsule external volume is preferably at least 1.4, in particular at least 1.6.

According to a second aspect of the invention, which is particularly advantageously combined with the first aspect of the invention, a coffee preparation system is provided which has the following elements:
- a coffee machine having a brewing chamber into which a portion capsule which can be pierced by injection-side piercing means and extraction-side piercing means of the coffee machine can be inserted in each case, and having a liquid pump for delivering hot water into the brewing chamber and through the injection-side piercing means into the portion capsule,
- a first type of coffee capsule having a first extraction material region which is filled with coffee powder, wherein the first extraction material region has a first volume, and
- a second type of coffee capsule having a second extraction material region which is filled with coffee powder, wherein the second extraction material region has a second volume,
- wherein external dimensions of coffee capsules of the first type of coffee capsule are substantially identical to external dimensions of coffee capsules of the second type of coffee capsule, and wherein the dimensions of coffee capsules of both types are matched to the brewing chamber, and
- wherein the first volume is greater than the second volume.

The two volumes of the first and the second extraction material region differ significantly in this case, for example, the first volume being at least 1.4 times the second volume, in particular at least 1.6 times the second volume.

In this case, the first volume is preferably also significantly greater than the filling volume of conventional espresso portion capsules, for example, 25 ml or more. The volume can be, in particular, between 25 ml and 40 ml for a filling quantity of approximately 10-18 g of coffee.

In preferred embodiments, the coffee capsules of the first type are completely filled with coffee, that is to say the first volume corresponds to a total coffee capsule volume (that is to say to the volume which is determined by the external dimensions minus the volume of the generally comparatively thin outer wall).

The coffee machine is, moreover, preferably designed for the purpose of driving the liquid pump in two different operating conditions for producing two different pumping pressures, wherein a first pumping pressure is below 5 bar or below 3 bar, and a second pumping pressure is above 8 bar or above 5 bar.

The capsule of the second type (or capsules according to the first aspect of the invention) and the coffee machine are matched to one another such that injection is performed on the side of the empty region.

BRIEF DESCRIPTION OF THE DRAWINGS

Exemplary embodiments of the invention will be described below with reference to drawings. In the drawings, identical reference symbols denote identical or analogous elements. The drawings are not drawn to scale and show elements which partially correspond to one another in different sizes from figure to figure. In the drawings.

DETAILED DESCRIPTION OF THE INVENTION

Figure 1:
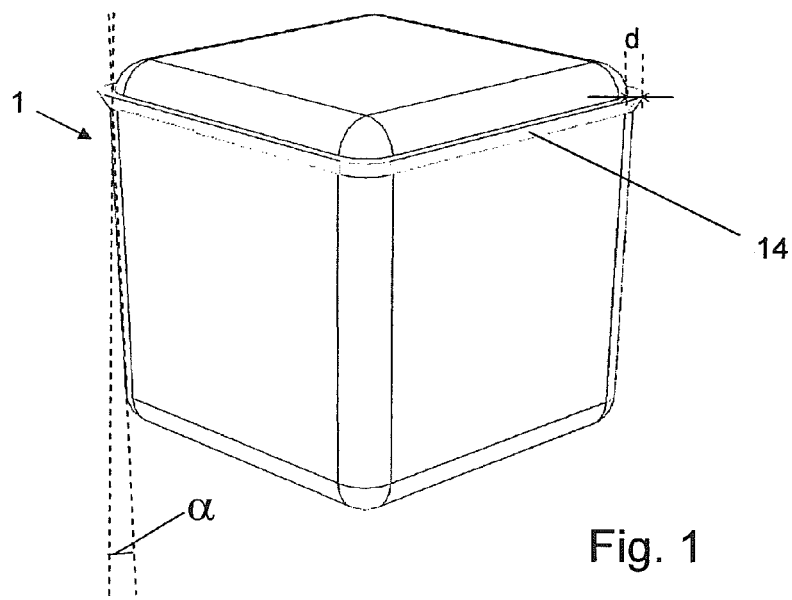
FIG. 1 shows a view of a coffee portion capsule.

The capsule 1 according to FIG. 1 is substantially cube-shaped. However, the side at the top in the figure is somewhat larger than the bottom, so that the capsule has a truncated pyramidal shape in the strictly mathematical sense. The inclination angle $\alpha$ of the surfaces at the sides in the figures in relation to the perpendicular to the base surface—this obviously meaning the plane which is perpendicular to the base surface and runs through the edge between the base surface and the corresponding lateral surface—is very small and is preferably at most 2°, for example only approximately 1°. In addition, the height of the capsule above the base surface corresponds approximately to the length of the base surface edge.

Figure 2:
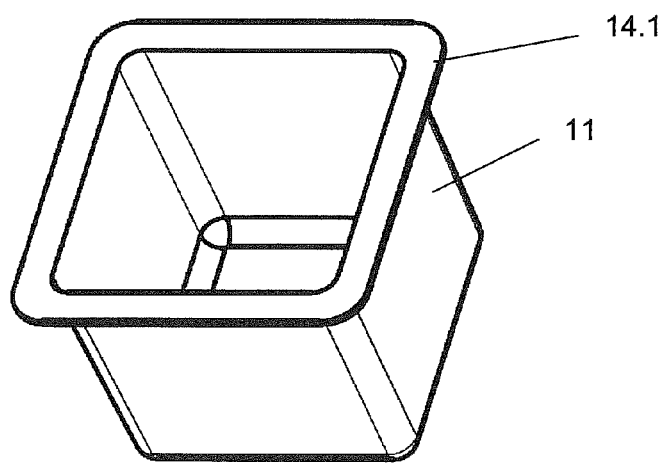
FIGS. 2 and 3 in each case show a view of the capsule body and of the capsule cover of the coffee portion capsule according to FIG. 1.
Figure 3:
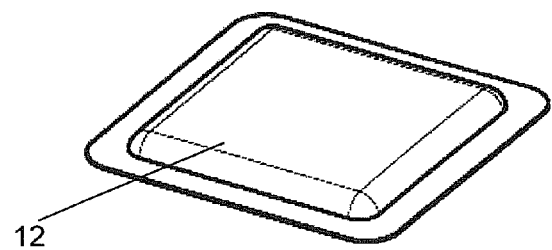
Figure 4:
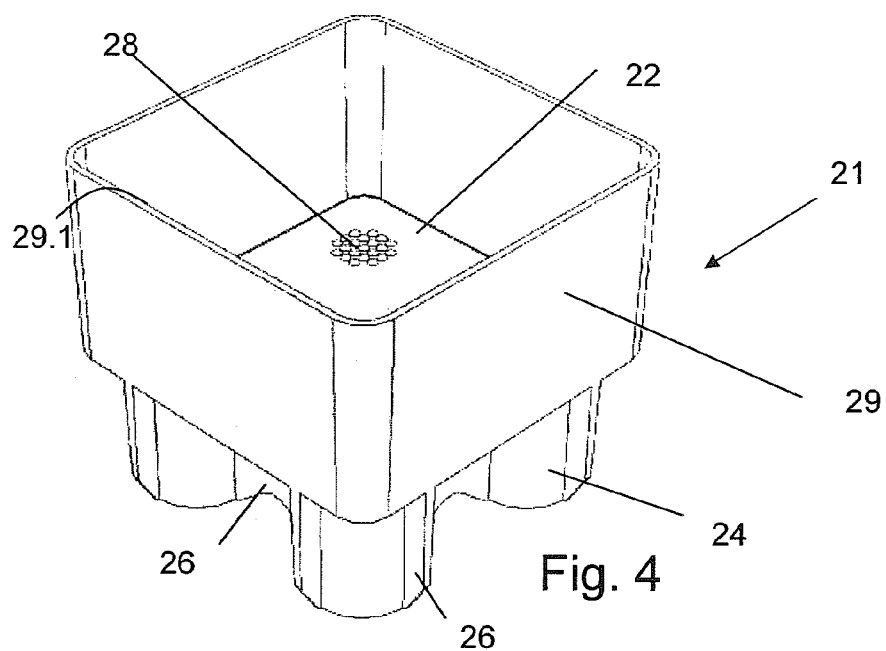
FIGS. 4 and 5 in each case show an insertion part of a portion capsule.
Figure 5:
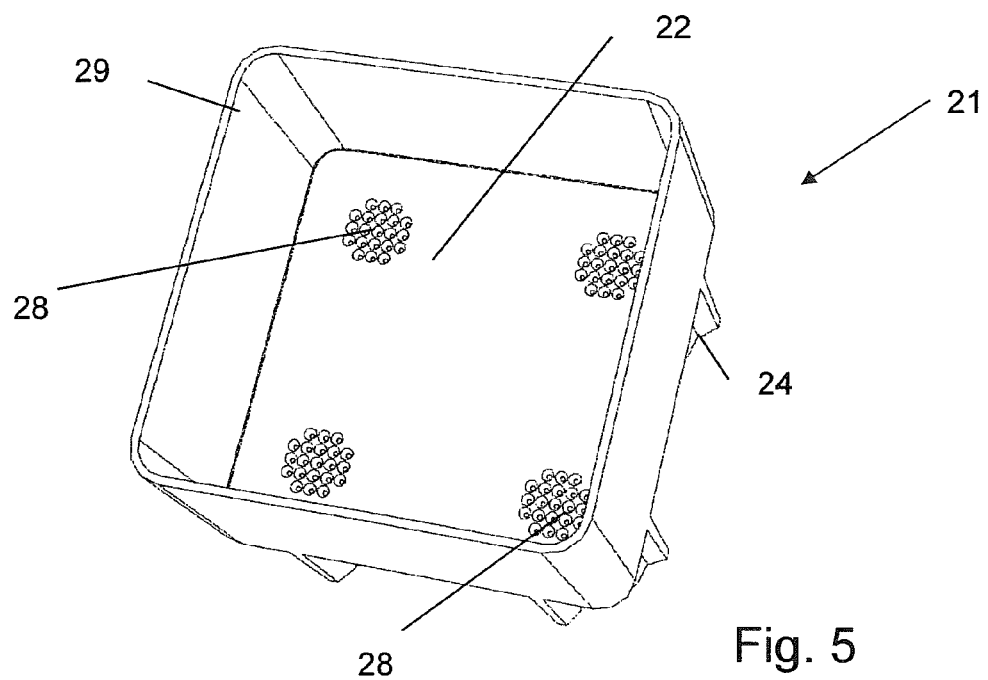

The capsule outer wall is produced from a capsule body 11, which is illustrated in FIG. 2, and a cover 12, which is depicted in FIG. 3, using an ultrasonic cut-and-seal process. Reference is made to international patent application PCT/CH2010/000097 in respect of the capsule outer wall and in respect of the method for producing said capsule outer wall. The angle $\alpha$ of approximately 1° which differs slightly from 0° and the peripheral welding bead 14, which protrudes on all sides by a maximum of approximately d=0.35 mm, that is to say a maximum of approximately 2 to 3%, are clearly shown.

The outer wall of the capsule is composed of polypropylene with a wall thickness of 0.1 mm and 0.5 mm, preferably between 0.2 mm and 0.4 mm, for example between 0.25 mm and 0.35 mm. Other materials are also feasible, in particular other foodstuff-compatible plastics. The wall thickness of the outer wall is, for example, approximately equal on all sides. The outer length of the cube edges is preferably between 30 mm and 34 mm for a filling quantity of 12 to 18 g of coffee.

In contrast to the capsule according to PCT/CH2010/000097, the capsule 1 according to the present description is not only filled with the extraction product (ground coffee) and homogenous in the interior, but an insertion part 21 is present in the interior of the capsule, as illustrated in FIGS. 4 to 7. Said insertion part is, for example, likewise produced from polypropylene and has a separation wall 22, which forms the separation element and which, when arranged in the capsule interior, separates an extraction material region, which is at the top in FIG. 4, from an empty region of the capsule which is at the bottom in FIG. 4. Tubular extensions 24, which have an approximately hollow-cylindrical shape and serve as the liquid channels, extend from the separation wall 22 to the side of the empty region. Optional strut-like reinforcements 26, which extend into the empty region like the liquid channels, are also present between the extensions 24 and on the outside of said extensions. Regions with passage openings 28 pass through the separation wall between the interior of the liquid channels and the extraction material region. During the brewing process, the hot brewing water from the bottom in FIG. 4 passes through said passage openings into the extraction material region, where it saturates the extraction material in a manner which is known per se.

In the illustrated embodiment, the insertion part also comprises a peripheral wall 29 projecting in the direction of the extraction material side in the manner of a collar. Together with the separation wall, this peripheral wall forms a cup-like structure, in which the extraction material or a portion thereof is located.

Figure 8:
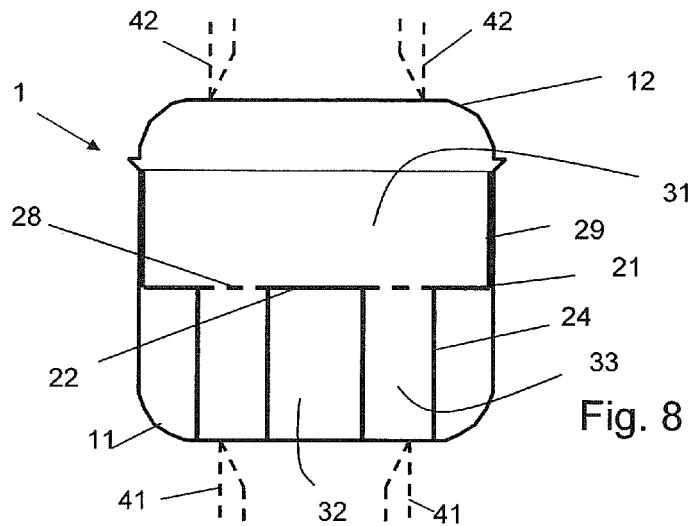
FIG. 8 is a schematic sectional illustration of the capsule with an insertion part.

FIG. 8 schematically shows how the insertion part 21 is arranged in the interior of the capsule 1. It also shows that the capsule is subdivided into three types of regions by the insertion part. The extraction material region 31 is separated from the empty region 32 by the separation wall 22 which is horizontal in FIG. 8. The liquid channel regions 33 are separated off by the liquid channels formed by the extensions 24 together with the region 28 of the separation wall 22, which is penetrated by the passage openings. The extensions extend as far as the empty region-side outer wall of the capsule and are connected to said outer wall, for example, in a liquid-tight manner. For the brewing process, a perforation means perforates the capsule outer wall on the injection side in the region of the liquid channels, said perforation means being dimensioned such that the capsule is perforated only in the region of the liquid channel regions 33 and the brewing liquid is shot only into these regions and not into the neighboring empty region 32. FIG. 8 shows injection-side perforation spikes 41 illustrated in a schematic manner using dashed lines, specifically in the position in which they begin the perforation process, which is effected by a relative movement of the spikes out of the illustrated position in the direction of the center of the capsule. The liquid passes, under pressure, through the passage openings 28 into the extraction material region 31, where a brewing process of the type known per se takes place. The beverage is discharged through perforations in the capsule wall at the top in FIG. 8. The extraction-side perforation spikes 42 are also schematically shown in the position in which they begin the perforation process in FIG. 8. When closing a brewing chamber comprising the perforation spikes 41, 42, the injection-side perforation spikes 41 and the extraction-side perforation spikes 42, for example, are simultaneously pushed through the outer capsule wall; however, as mentioned, only the injection-side perforation spikes can initially perforate said outer wall, and the extraction-side perforation spikes can pierce said outer wall on account of the capsule being deformed under the pressure of the brewing liquid.

Figure 6:
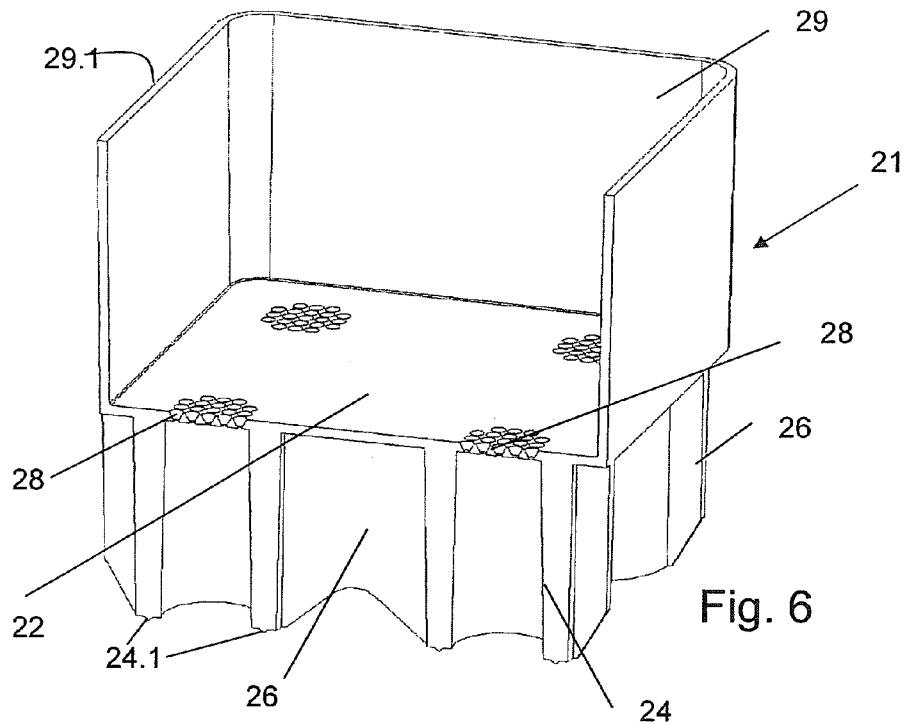
FIG. 6 is an illustration of the sectioned insertion part.
Figure 7:
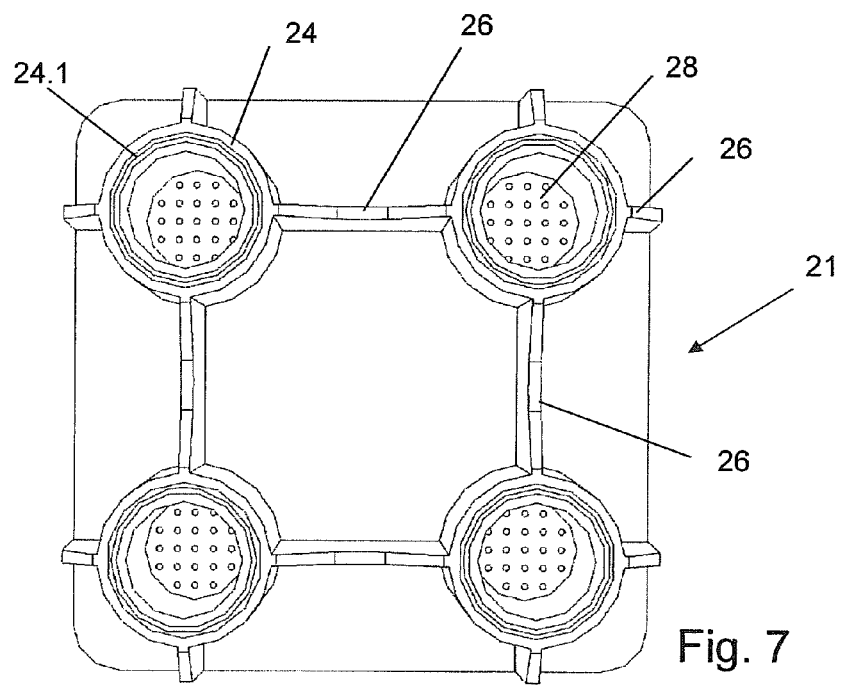
FIG. 7 shows a view of the insertion part from below.

Further features are clearly shown in FIG. 6.

Firstly, it can be seen that the passage openings 28 are not cylindrical, but rather taper conically toward the bottom—that is to say in the direction of the empty region. This design has the aim and the effect of coffee powder being captured/wedged in the funnel-like conical region and then not entering the liquid channel region 33 when the capsule is subject to mechanical shaking phenomena. This also works when the diameter of the passage openings at their narrowest point is larger than the average particle size of the coffee powder.

Secondly, FIG. 6 shows that the tubular extensions 24, which form the liquid channels, have a tapering comb 24.1 at their end (that is to say, the empty region-side end), said comb acting as an energy direction transmitter when the insertion part is ultrasonically welded to the outer wall at the end on the empty region side.

Figure 9:
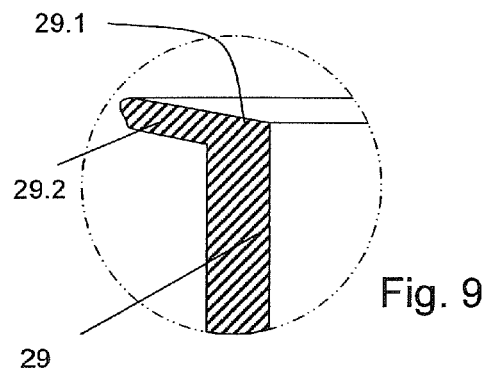
FIGS. 9 and 10 in each case show, in an enlarged sectional illustration, a detail of the insertion part and, respectively, of the capsule outer wall and of the insertion part.

FIG. 9 further shows a detail which is not shown in FIGS. 3-8 but may be present in the embodiment of FIGS. 1-8. An outwardly projecting tab 29.2 is formed on the edge 29.1 of the peripheral wall 29, said tab in this case being integral with the peripheral wall 29 and being able to yield flexibly 'upward' (that is to say in the direction of the extraction material side) or 'downward' (that is to say in the direction of the empty side) on account of its thickness. In the case of insertion into the position illustrated in FIG. 8, the tab 29.2 is pressed inward and upward by the outer wall.

The tab 29.2 has a sealing effect during the brewing process and prevents the brewed beverage from being able to return to the empty region along the outside of the peripheral wall on account of the brewing pressure in the interior of the extraction material region. The brewing pressure in the interior of the extraction material region will press the caps 29.2 outward against the capsule outer wall—which is supported by external means of the brewing chamber under certain circumstances—and thereby automatically intensify the sealing effect.

Figure 10:
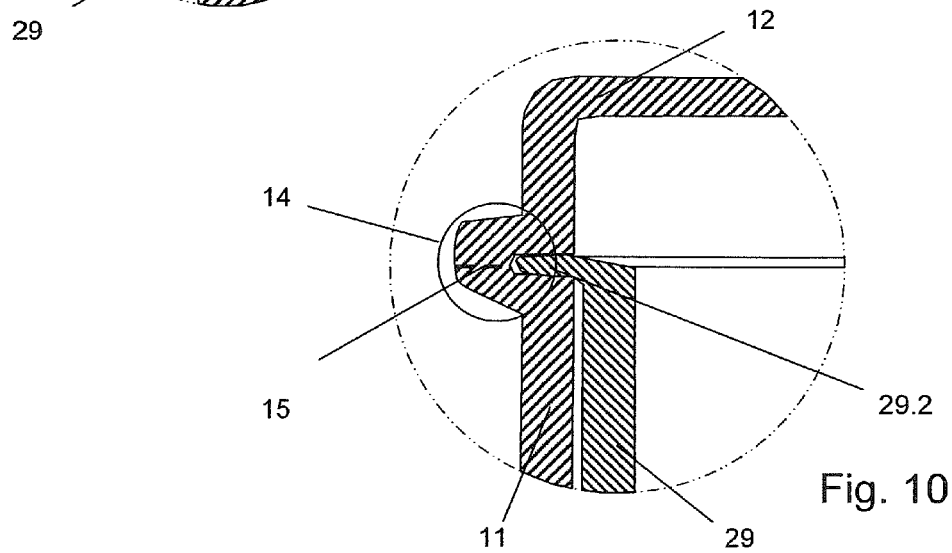

Under certain circumstances, provision can additionally be made for the tab, on account of its position when the capsule is closed using the cut-and-seal process, to be clamped between the peripheral collar 14.1 of the capsule body 11, which collar was initially present and separated off during the cut-and-seal process, and the cover 12, and a kind of labyrinth seal or even a cohesive connection being produced between the capsule wall and the insertion part by virtue of the capsule being closed. This is illustrated in FIG. 10. FIG. 10 shows a detail of the capsule at the point at which the cover 12 is connected to the capsule body using the cut-and-seal process. Since the connection is a welded connection and therefore a cohesive connection, no separation line is visible between the material of the capsule body 11 and the material of the cover 12. The dashed line 15 shows the approximate profile of the transition between the capsule body and the cover. The peripheral collar 14.1 has been separated off in the cut-and-seal process.

The tab 29.2 is clamped, as illustrated, between the cover and capsule body in the region of the welding bead, this having the effect of a sealing means in the sense of a labyrinth seal. The collar may also be welded to the capsule body and/or cover. The capsule is produced as follows:

In a first step, the capsule body 11 is made available and the insertion part 21 is inserted into said capsule body. The ends of the extensions 24 of the insertion part 21 are then firmly welded to the "bottom" of the capsule body by means of ultrasonic welding. The capsule is then filled with the extraction material. The cut-and-seal process is then used to attach the cover to the capsule body, wherein the tab of the insertion part may possibly also be firmly clamped or even welded, as mentioned.

Yet further alternative embodiments of capsules according to the invention will be discussed in the text which follows. Only the differences from the above-discussed capsule will be discussed. The principles and features of the above-described embodiment also apply—where applicable—to the alternative embodiments.

Figure 11:
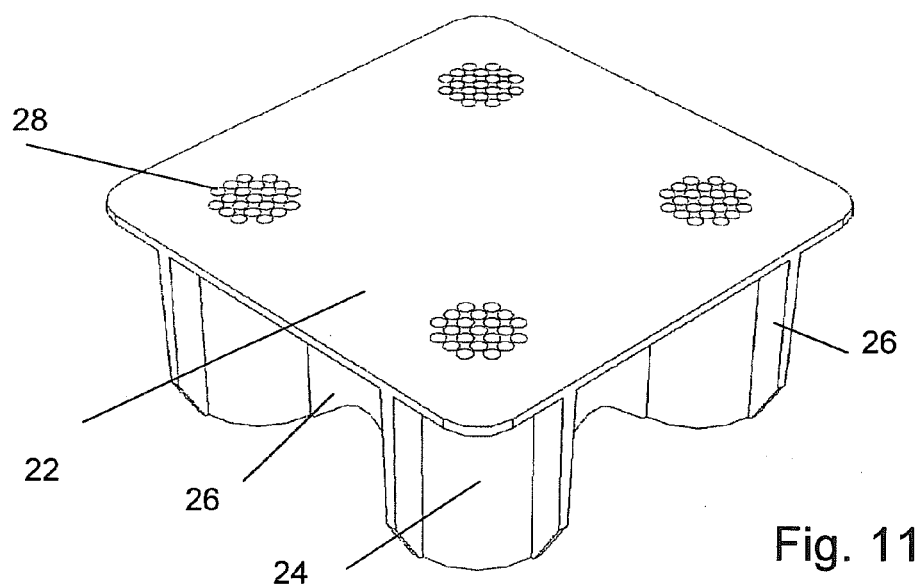
FIG. 11 shows an insertion part of an alternative embodiment.

The insertion part according to FIG. 11 does not have a peripheral wall, but rather consists only of the separation wall 22 and the extensions 24 with the optional reinforcements 26. A peripheral tab (not illustrated in the figure) which directly adjoins the separation wall may be present, said tab having a sealing effect in line with the discussed principle.

Figure 12:
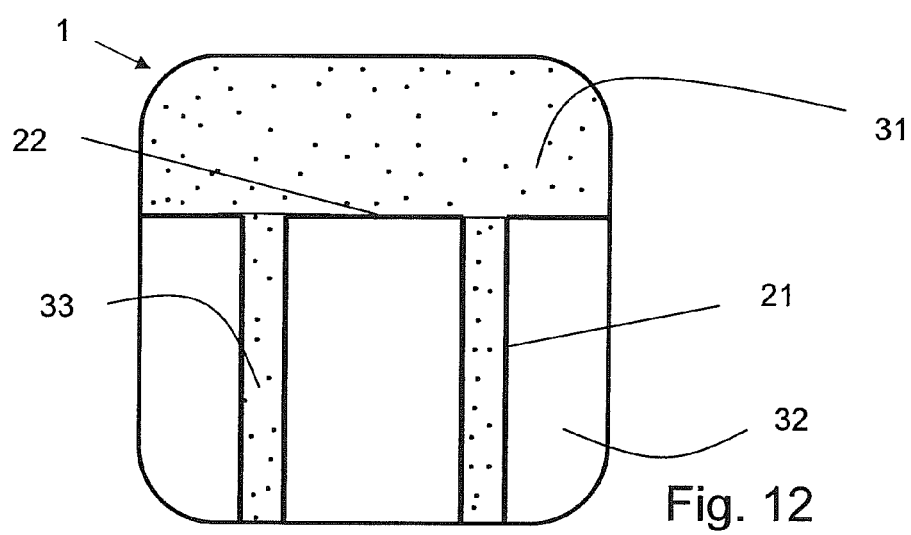
FIGS. 12 and 13 in each case show an alternative embodiment of a portion capsule.

The capsule (only schematically illustrated) according to FIG. 12 differs from the above-described embodiments only in that the extraction material region 31 and the liquid channel regions 33 are coherent and merge with one another. The separation wall 22 is, therefore, interrupted at the transition to the liquid channels, and the extraction material also enters the liquid channels. The dotted region in FIG. 12 indicates how the extraction material is distributed. It goes without saying that the principle according to FIG. 12 can be provided for embodiments with or without the peripheral wall and for embodiments with or without the sealing tab.

The principle shown in FIG. 12 can be further modified. By way of example, a single present liquid channel or a plurality of liquid channels can be widened such that the liquid channel/the liquid channels form the entire extraction material region. The liquid channel/the liquid channels is/are then be filled with extraction material and traverse the entire capsule interior as far as the top side. Sealing off at the top can be effected, for example, by a sealing tab which projects upward and inward. As an alternative, given suitable selection of the energy direction transmitters, the insertion part which forms the liquid channel/the liquid channels can simultaneously be welded to the capsule outer wall both at the top and at the bottom.

Figure 13:
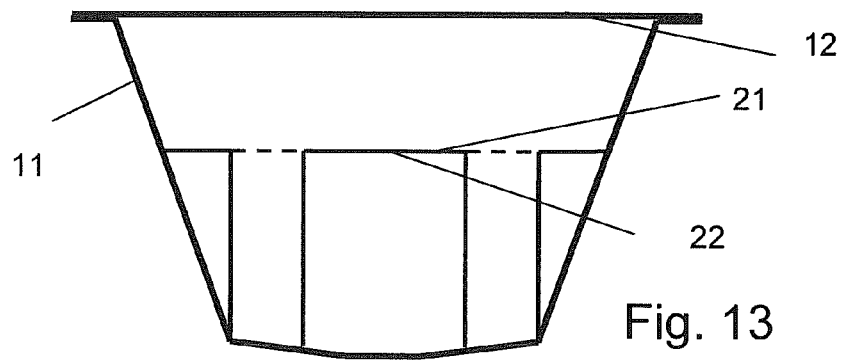

The capsule illustrated in FIG. 13 differs from the above-described embodiments by virtue of its outer shape. The capsule has the shape of a rotationally symmetrical cup which tapers downward (that is to say in the direction of the empty region) in a conical manner and has an outwardly projecting collar. In the region of the collar, the cup-like capsule body 11 is welded to the flat cover 12. The insertion part 21 has a correspondingly adapted shape, that is to say the separation wall 22 is in the form of a disk. Otherwise, the same principles apply as in the case of the above-described embodiments.

In the above description of embodiments, it has been assumed in each case that the brewing liquid is injected on the side of the empty region and is discharged on the side of the extraction material region. This is a particularly expedient arrangement because, amongst other reasons, no brewed beverage which remains in the liquid channels after the brewing process is 'wasted' and also because it may be possible that problems in respect of blockages in the region of the passage openings cannot occur since only water is conducted through said passage openings. However, another option may well be to provide the reverse, that is to introduce the brewing liquid directly into the extraction material region and to discharge the beverage through the liquid channels.

Figure 14:
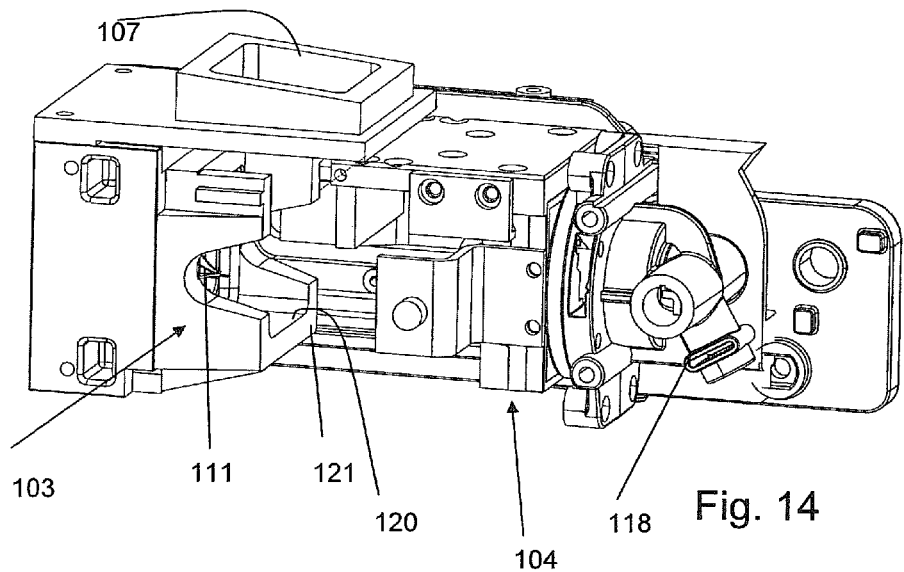
FIG. 14 shows a view of a brewing module of a coffee machine.

FIG. 14 shows a brewing module of a coffee machine. The brewing module can be designed, for example, in accordance with the teaching of PCT/CH2010/000099 (with or without means for capsule compression), the content of said document forming a constituent part of the present patent application by reference.

The brewing module forms a brewing chamber in a closed state (a non-closed state is illustrated in FIG. 14 for reasons of clarity), the geometry and dimensions of said brewing chamber being matched to a corresponding capsule. On account of the procedure according to the invention, the brewing module is designed both for capsules with a large filling quantity and without the separation element, also for capsules with a reduced filling quantity and with the separation element.

The brewing module comprises, in a manner which is known per se, a discharge apparatus 103, which is routed between a frame with two vertical guide walls, and an injector 104, it being possible to move said discharge apparatus and injector relative to one another in a manner driven by a pivotable operator control lever, for example.

FIG. 14 clearly shows the input opening 107 for inputting the portion capsule which is substantially cubic here. The input opening 107 is formed in the frame, is located in the region of the discharge opening 103 and remains stationary, like said discharge apparatus, when the operator control lever is moved. The input opening 107 can be slightly conical so as to taper toward the bottom, in order to thereby have a centering effect on the capsule as it is being inserted, without the risk of the capsule tilting being too high.

Capsules with a separation element (in this case with an insertion part which forms a separation wall) are input such that the side which is at the bottom in FIGS. 1, 4, 6, 8, 11 and 12 (corresponding to the side with the empty region) is located on the injector side, that is to say on the right-hand side in FIG. 14.

In the operating state, the brewing module serves as a horizontal brewing module of a coffee machine which, in addition to the brewing module, has a water tank, a water heating apparatus (for example a flow heater) and a pump for supplying brewing water to the injector 104. The corresponding supply channels 118 of the injector can be formed in a manner known per se. The injector also has at least one piercing spike with an associated supply opening, so that the capsule can be pierced and supplied with the extraction fluid through the supply opening. The coffee machine also has, for example, a capsule container which is arranged beneath the brewing chamber and into which the capsule is automatically ejected, after the brewing process, by the operator control lever being raised.

The discharge apparatus 103 is also provided with at least one piercing spike 111 and an associated discharge opening. Depending on the design, a discharge line is also present, said discharge line being used to route coffee (or the like) emerging from the outlet from the discharge apparatus 103 in such a manner that it runs into a cup, which has been placed in the intended location.

In the illustrated embodiment, the discharge apparatus 103 forms a capsule holder with a support 121, which defines the support surface 120, for the capsule inserted through the input opening 107. The approximately cube-shaped capsule, which is introduced through the input opening while the brewing chamber is open, rests on the support 121 in a manner guided by the first side walls. The brewing chamber is then closed by a movement of the injector in the direction of the discharge apparatus 103, as a result of which the capsule is also pierced. In the illustrated embodiment, the capsule is pierced both, on the injector side and on the side of the discharge apparatus 103 before the brewing process starts. However, embodiments—in particular with aluminum, but also with plastic as the material of the capsule wall or a portion thereof—are also feasible, the capsule being marked or pierced on the side of the discharge apparatus 103 initially by the internal pressure in the capsule when the brewing process is started.

Figure 15:
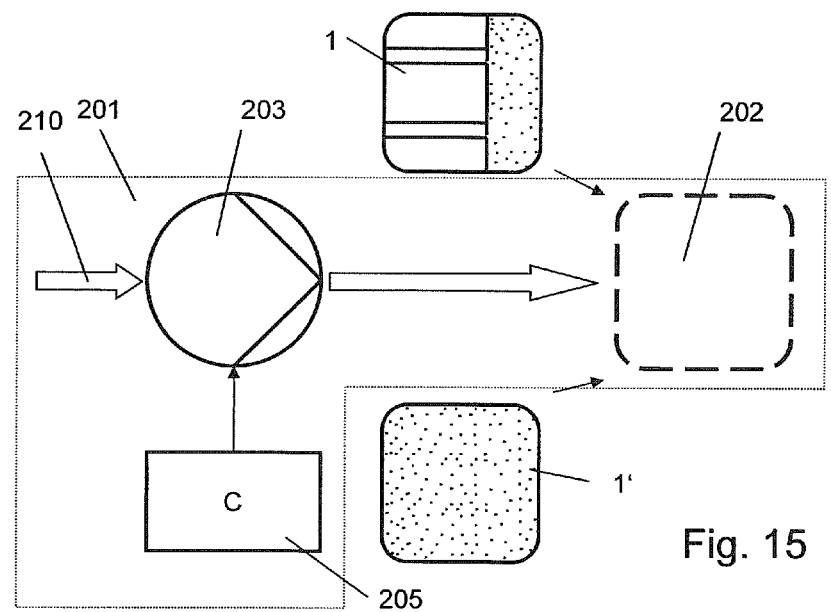
FIG. 15 is a schematic illustration of components of a system according to the invention.

FIG. 15 shows, in a highly schematic manner, a coffee preparation system according to the first aspect of the invention. The coffee machine 201 comprises, in addition to a brewing chamber 202—for example of the kind illustrated by FIG. 14 or, for example, formed by a plunger and an abutment surface for the plunger—a pump for delivering hot water 210, it being possible to supply the hot water to the brewing chamber under pressure through said pump. A pump driving means 205 controls the pumping and brewing pressure. In particular, the coffee machine can be designed for the purpose of selectively operating at a relatively low pumping pressure of, in many cases, less than 5 bar, in particular less than 3 bar, for example approximately 1.5-2 bar ("filter coffee") or a relatively high pumping pressure of at least 5 bar, in particular at least 8 bar, for example between 8 bar and 20 bar ("espresso"). The changeover between the various pumping pressures is often made manually. However, a device which controls this automatically, for example on the basis of the features of an input capsule, can also be present. By way of example, the various capsules of the system can be provided with different markings, which can be read optically or by means of RFID or the like and are identified by a corresponding reading apparatus of the coffee machine, with the pumping pressure then being correspondingly adjusted.

The coffee preparation system also comprises at least two types of coffee portion capsules 1, 1'. Said coffee portion capsules differ in respect of the internal volume (volume of the extraction material region) that is available for the extraction material, while the external dimensions are substantially identical. In particular, a capsule type 1 ("espresso capsule") can be designed according to the first aspect of the invention, while another capsule type 1' ("filter coffee capsule") is of conventional design and therefore has a completely filled interior space or, for example, can also have a filter, which is arranged in the capsule interior.

In the case of the coffee preparation system according to the second aspect of the invention, it would also be possible to design the capsule type for the espresso capsule other than according to the first aspect of the invention and, for example, to omit the liquid channels, as a result of which the empty region of the espresso capsule would be flooded with water or the beverage during the brewing process.

It is possible to employ the procedure according to the first aspect or according to the second aspect for beverages other than coffee—for example tea.

The invention claimed is:

1. A portion capsule for a brewed beverage, comprising:
    an outer wall, a separation element, and an extraction material region, said extraction material region being defined between the outer wall and the separation element in the capsule interior and being filled with an extraction material,
    wherein an empty region is present in the capsule interior, said empty region being defined between the outer wall and the separation element and being separated from the extraction material region by the separation element, and
    wherein at least one liquid channel is also present in the capsule interior and extends from said outer wall to said separation element, said at least one liquid channel and said separation element being connected to one another in a fluid tight manner and cooperating to direct liquid, which is introduced into the capsule via the at least one liquid channel at an injection location, such that the liquid comes into contact with the extraction material and can be discharged from the capsule at a point, which is not the injection location, while substantially preventing the liquid from entering the empty region.

2. The portion capsule according to claim 1, wherein the at least one liquid channel traverses the empty region.

3. The portion capsule according to claim 2, wherein the at least one liquid channel is in the form of a pipe.

4. The portion capsule according to claim 1, wherein the separation element is formed by an insertion part, which is inserted into a capsule body, which is closed by a lid.

5. The portion capsule according to claim 4, wherein the insertion part comprises at least one extension, which projects away from the separation element, in the form of a hollow body, which extends as far as the outer wall and forms the at least one liquid channel, wherein the extension is connected, adhesively bonded or welded, to the outer wall.

6. The portion capsule according to claim 4, wherein the insertion part comprises a peripheral wall, which, together with the separation element, forms a cup-like structure, which is filled with at least some of the extraction material.

7. The portion capsule according to claim 4, wherein the insertion part comprises a seal tab, which is pressed against the outer wall by an elevated pressure in the extraction material region.

8. The portion capsule according to claim 7, wherein the outer wall is formed by a capsule body and a lid closing said capsule body, wherein the seal tab is clamped between the capsule body and the lid.

9. The portion capsule according to claim 1, wherein the empty region is hollow, apart from the at least one liquid channel and any reinforcements.

10. The portion capsule according to claim 1, wherein the separation element comprises a plurality of passage openings, which connect the extraction material region to the at least one liquid channel, wherein the passage openings taper in a conical manner in the direction of the liquid channel.

11. A beverage preparation system, comprising:
    a beverage preparation machine with a brewing chamber, capable of receiving a portion capsule, which can be pierced by injection-side piercing means and extraction-side piercing means of the beverage preparation machine, and with a liquid pump for delivering hot water into the brewing chamber and through the injection-side piercing means into the portion capsule,
    a first capsule with a first extraction material region, which is filled with extraction material, wherein the first extraction material region comprises a first volume, and
    a second capsule with a second extraction material region, which is filled with an extraction material, wherein the second extraction material region comprises a second volume,
    wherein external dimensions of the first capsule are substantially identical to external dimensions of the second capsule, and wherein the dimensions of capsules of both types are aligned to the brewing chamber,
    wherein the second capsule is a portion capsule including an outer wall and wherein the second extraction material region, is arranged in the capsule interior, wherein an empty region is present in the capsule interior, said empty region being separated from the extraction material region by a separation element, which is likewise present in the capsule interior, and wherein at least one liquid channel is also present in the capsule interior in such a way that liquid, which is introduced into the capsule at an injection location, comes into contact with the extraction material and can be discharged from the capsule at a point, which is not the injection location, substantially without the liquid entering the empty region and wherein
    the first volume is greater than the second volume.

12. A beverage preparation system, comprising
    a beverage preparation machine with a brewing chamber capable of receiving a portion capsule, which can be pierced by injection-side piercing means and extraction-side piercing means of the beverage preparation machine, and with a liquid pump for delivering hot water into the brewing chamber and through the injection-side piercing means into the portion capsule,
    a first type of capsule with a first extraction material region, said first extraction material region having an available first volume to receive extraction material, said first extraction material region receiving a first amount of extraction material in said first available volume, and a second type of capsule with a second extraction material region, said second extraction material region having a second available volume to receive extraction material, said second extraction material region receiving a second amount of extraction material in said second available volume, wherein external dimensions of coffee capsules of the first type of capsule are substantially identical to external dimensions of capsules of the second type of capsule, and wherein the dimensions of capsules of both types are aligned to the brewing chamber, wherein the first available volume of said first type of capsule is greater than the second available volume of said second type of capsule.

13. The beverage preparation system according to claim 12, wherein a pumping pressure of the delivery pump can be switched over between at least two different operating conditions.

14. The beverage preparation system according to claim 12, wherein the first available volume is at least 25 ml.

15. A portion capsule for a brewed beverage, comprising:
an outer wall, a separation element, and an extraction material region, said extraction material region being defined between the outer wall and the separation element in the capsule interior and being filled with an extraction material, wherein an empty region is present in the capsule interior, said empty region being defined between the outer wall and the separation element and being separated from the extraction material region by the separation element, and wherein at least one liquid channel is also present in the capsule interior and extends from said outer wall to said separation element, said at least one liquid channel and said separation element are integrally connected to one another to form a unitary structure such that, in use, the separation element and liquid channel are immovably affixed to one another and cooperate to direct liquid, which is introduced into the extraction material region at an injection location and flows through the extraction material region to a discharge point via the at least one liquid channel, such that the liquid comes into contact with the extraction material and is discharged from the capsule at the discharge point, while substantially preventing the liquid from entering the empty region, and wherein said discharge point is different from the injection location.

16. The portion capsule according to claim 15, wherein the at least one liquid channel traverses the empty region.

17. The portion capsule according to claim 16, wherein the at least one liquid channel is in the form of a pipe.

18. The portion capsule according to claim 15, wherein the separation element is formed by an insertion part, which is inserted into a capsule body, which is closed by a lid.

19. The portion capsule according to claim 18, wherein the insertion part comprises at least one extension, which projects away from the separation element, in the form of a hollow body, which extends as far as the outer wall and forms the at least one liquid channel, wherein the extension is connected, adhesively bonded or welded, to the outer wall.

20. The portion capsule according to claim 18, wherein the insertion part comprises a peripheral wall, which, together with the separation element, forms a cup-like structure, which is filled with at least some of the extraction material.

21. The portion capsule according to claim 18, wherein the insertion part comprises a seal tab, which is pressed against the outer wall by an elevated pressure in the extraction material region.

22. The portion capsule according to claim 21, wherein the outer wall is formed by a capsule body and a lid closing said capsule body, wherein the seal tab is clamped between the capsule body and the lid.

23. The portion capsule according to claim 15, wherein the empty region is hollow, apart from the at least one liquid channel and any reinforcements.

* * * * *